(12) United States Patent  
Tian et al.

(10) Patent No.: US 12,387,485 B1
(45) Date of Patent: Aug. 12, 2025

(54) REMOTE SENSING SUB-PIXEL RUNOFF INVERSION METHOD BASED ON IMPROVED VEGETATION INDEX METHOD

(71) Applicant: Nanjing University of Information Science & Technology, Nanjing (CN)

(72) Inventors: Ye Tian, Nanjing (CN); Guoqing Wang, Nanjing (CN); Xing Yuan, Beijing (CN); Bingrong Zhou, Xining (CN); Shunan Xiang, Nanjing (CN)

(73) Assignee: Nanjing University of Information Science & Technology, Nanjing (CN)

( * ) Notice: Subject to any disclaimer, the term of this patent is extended or adjusted under 35 U.S.C. 154(b) by 0 days.

(21) Appl. No.: 19/007,683

(22) Filed: Jan. 2, 2025

(30) Foreign Application Priority Data

Feb. 2, 2024 (CN) .......................... 202410146413.4

(51) Int. Cl.
*G06V 20/10* (2022.01)
*G06V 10/25* (2022.01)
(Continued)

(52) U.S. Cl.
CPC ............ *G06V 20/182* (2022.01); *G06V 10/25* (2022.01); *G06V 10/751* (2022.01); *G06V 20/13* (2022.01);
(Continued)

(58) Field of Classification Search
None
See application file for complete search history.

(56) References Cited

U.S. PATENT DOCUMENTS

2013/0286377 A1* 10/2013 Heege ..................... G01S 17/46
356/4.07
2022/0383633 A1* 12/2022 Zhang .................... G06V 20/70

FOREIGN PATENT DOCUMENTS

| CN | 115993336 A | * | 4/2023 | |
| CN | 116952906 A | * | 10/2023 | ............. G01N 21/59 |
| CN | 118429828 A | * | 8/2024 | |

OTHER PUBLICATIONS

Wu H, Bao Z, Wang J, Wang G, Liu C, Yang Y, Zhang D, Liang S, Zhang C. Inverse Trend in Runoff in the Source Regions of the Yangtze and Yellow Rivers under Changing Environments. Water. 2022; 14(12):1969. https://doi.org/10.3390/w14121969 (Year: 2022).*

* cited by examiner

*Primary Examiner* — Ian L Lemieux
(74) *Attorney, Agent, or Firm* — Hemisphere Law, PLLC; Zhigang Ma

(57) ABSTRACT

A remote sensing sub-pixel runoff inversion method based on an improved vegetation index method includes: extracting an image of a target water from remote sensing satellite data; calculating a width of the target water using remote sensing data, inversing a width of the target water using remote sensing subpixels, and using one of the widths of the target water with a higher accuracy as a target width; remote sensing and estimating a flow velocity and a depth of the target water, and calculating a runoff of a small river. The improved vegetation index method can decompose pixels to extract a river width with a higher accuracy, which can meet accuracy requirements of some small rivers in mountainous areas, and then effectively applied in flow inversion of the small rivers with high accuracy requirements to improve runoff inversion effect, which has good economy, practicability, flexibility, and a certain physical mechanism.

4 Claims, 1 Drawing Sheet extracting an image of a target water from remote sensing satellite data using a MNDWI threshold method — Step 1 calculating a width of the target water using remote sensing data, and inversing a width of the target water using remote sensing subpixels; comparing accuracies of the widths of the target water obtained by the calculating and the inversing, and using one of the widths of the target water with a higher accuracy as a target width — Step 2 remote sensing and estimating a flow velocity and a depth of the target water according to the target width of the target water, and calculating a runoff of a small river according to the target width, the depth and the flow velocity — Step 3

(51) Int. Cl.
*G06V 10/75* (2022.01)
*G06V 20/13* (2022.01)
(52) U.S. Cl.
CPC ........ *G06V 20/188* (2022.01); *G06V 2201/07* (2022.01)

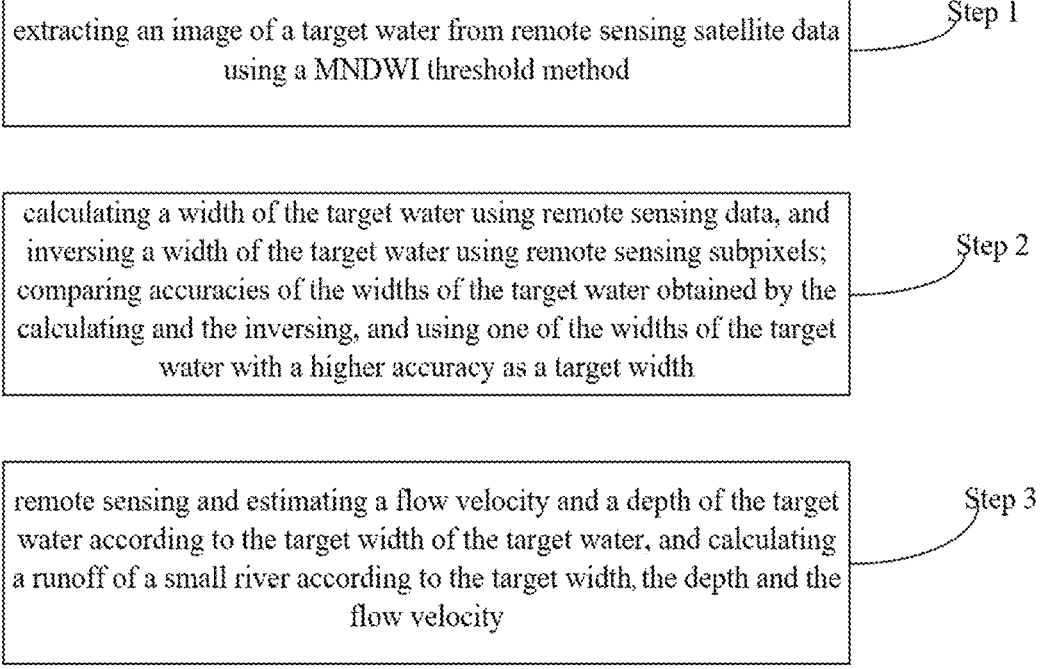

REMOTE SENSING SUB-PIXEL RUNOFF INVERSION METHOD BASED ON IMPROVED VEGETATION INDEX METHOD

CROSS-REFERENCE TO RELATED APPLICATION

This application claims priority to Chinese Patent Application No. 202410146413.4, filed on Feb. 2, 2024, which is herein incorporated by reference in its entirety.

TECHNICAL FIELD

The disclosure relates to the field of hydrogeographic technologies, and more particularly to a remote sensing sub-pixel runoff inversion method based on an improved vegetation index method.

BACKGROUND

An existing remote sensing inversion river runoff method in the related art mainly involves first extracting a water based on remote sensing image data, estimating hydraulic parameters such as river widths, gradients and river depths, and then using a relationship fitting method and a Manning's formula to calculate runoff. In this process, the extracting of water is a key step in a river runoff inversion. Optical remote sensing water extractions mainly include water index methods and a vegetation index method, and the water index methods include, for example, a normalized difference water index (NDWI) and a modified normalized difference water index (MNDWI). A principle of the water index methods is based on reflection or absorption characteristics of different wavebands to distinguish a water from land and extract features of the water in remote sensing images. A calculation method of water index is relatively mature, but data quality is easily affected by clouds and severe weather, and requires remote sensing data of appropriate wavebands. A water width as extracted is limited by pixels. In comparison, the vegetation index method is based on a difference between a water and land, and uses high-resolution multispectral or hyperspectral remote sensing data, and thus can more accurately capture a parameter value of river width in the water.

Remote sensing data have advantages of being less restricted by the ground, having a wide coverage area, and being easy to obtain. The existing remote sensing runoff inversion technology mainly utilizes the water index method to obtain the river width, which relies heavily on a resolution of images themselves, and thus is limited by a spatial resolution limitation of existing non-commercial satellite images, hindering accurate quantification of the river width (such as width<30 meters). When measuring the river width through satellite images, errors arise from pixels where water and land mix. The reason is that river boundaries often run through image pixels rather than along their edges, which makes it difficult to accurately capture the river boundaries. The existing runoff inversion method of which accuracy is affected by mixed pixels cannot meet precision requirements for small rivers. Therefore, small rivers, such as those each with a width less than one pixel (Sentinel's resolution is 10 meters), are difficult to be identified in remote sensing images.

SUMMARY

A purpose of the disclosure is that: in view of the above problems, the disclosure aims to provide a remote sensing sub-pixel runoff inversion method based on an improved vegetation index method.

Technical solutions are that: a remote sensing sub-pixel runoff inversion method based on the improved vegetation index method according to the disclosure includes the following steps:

step 1, extracting an image of a target water from remote sensing satellite data using a modified normalized difference water index (MNDWI) threshold method;

step 2, calculating a width of the target water using remote sensing data, and inversing a width of the target water using remote sensing subpixels; comparing accuracies of the widths of the target water obtained by the calculating and inversing, and using one of the widths of the target water with a higher accuracy as a target width; and step 3, remote sensing and estimating a flow velocity and a depth of the target water according to the target width of the target water, and calculating a runoff of a small river according to the target width, the depth and the flow velocity. The small river refers to a river with a width less than 30 meters.

In an embodiment, the remote sensing sub-pixel runoff inversion method based on the improved vegetation index method is executed by one or more processors and further includes: superposing the runoff of the small river onto a satellite image map to obtain a superposed image map; and displaying the superposed image map on a display screen. Therefore, the superposed image map can present information associated with the runoff of the small river, which makes related personnel aware of the runoff of the small river, thereby allowing the related personnel to take necessary response measures including sending flood warnings to people and evacuating them.

In an embodiment, the step 1 includes:

based on Sentinel-2 remote sensing satellite data provided by a GEE cloud platform, calculating modified normalized difference water indexes MNDWI of a remote sensing satellite image in green waveband and middle-infrared waveband, as per a calculation formula as follows:

$$MNDWI = \frac{\rho_{Green} - \rho_{MIR}}{\rho_{Green} + \rho_{MIR}}$$

where $\rho_{Green}$ represents a reflectivity of green waveband, $\rho_{MIR}$ represents a reflectivity of middle-infrared waveband, and a range of a MNDWI is [a, b], a≥−1, b≤1;

setting a threshold value $t_0$ to divide a MNDWI image into two categories, that is, classifying a part satisfying a≤$t_0$ as a non-water and a part satisfying $t_0$<b as the target water; recording occurrence probabilities of the non-water and the target water in the remote sensing satellite image as $P_{nw}$ and $P_w$ respectively, and calculating an inter-class variance σ between images of the target water and the non-water, as per a calculation formula as follows:

$$\sigma^2 = P_{nw} \cdot (M_{nw} - M)^2 + P_w \cdot (M_w - M)^2$$

where M represents an overall mean value of the MNDWI image, and M=$P_{nw} \cdot M_{nw}+P_w \cdot M_w$; $M_{nw}$ represents a mean value of MNDWI index of the non-water image, and $M_w$ represents a mean value of MNDWI index of the target water image;

calculating an optimal threshold $T_{opt}$ according to the inter-class variance σ, as per a calculation formula as follows:

$$T_{opt} = \text{ArgMax}\{\sigma^2\}$$

segmenting the MNDWI image using the optimal threshold $T_{opt}$, identifying a part of the remote sensing image as the target water when MNDWI of a pixel is greater than or equal to $T_{opt}$, otherwise regarding as the non-water and excluding, thereby obtaining binary image data represented as:

$$A = \begin{cases} 1, & MNDWI \geq T_{opt} \\ 0, & MNDWI < T_{opt} \end{cases}$$

where A represents a water contribution value in a binary segmented image.

In an embodiment, the inversing a width of the target water using remote sensing subpixels in the step 2 includes the following steps:

step 21, selecting a river section with vegetation distribution on two sides thereof and substantially straight in the remote sensing satellite image, using a maximum river width of the river section over a plurality of years as a benchmark, and selecting, along a direction perpendicular to a flow direction of the river, a single row of pixels being greater than the maximum river width as a region of interest (ROI);

step 22, based on a Sentinel-2 remote sensing satellite image, calculating normalized difference vegetation indexes (NDVIs) of mixed pixels and pure vegetation pixels in the ROI, and counting numbers of the mixed pixels, pure water pixels and the pure vegetation pixels through the NDVIs in different ranges;

step 23, calculating a water area based on the number of the pure water pixels, as per a calculation formula as follows:

$$S_2' = R \times T^2$$

where $S_2'$ represents the water area corresponding to the pure water pixels, R represents the number of the pure water pixels, and T represents a pixel resolution;

step 24, according to a relationship between a vegetation area and a water area of each of the mixed pixels and the NDVI of the mixed pixel, constructing a relationship formula of vegetation index and water;

$$\frac{NDVI_1}{NDVI_2} = c \times S_1'$$

where $NDVI_1$ represents the NDVI of the mixed pixel, $NDVI_2$ represents the NDVI of each of the pure vegetation pixels, $S_1'$ represents the water area corresponding to the mixed pixel, and c represents a constant to be determined; and performing sub-pixel decomposition on the mixed pixels by using the relationship formula;

step 25, measuring a total water area S' according to a red, green and blue (RGB) image provided by Ovitalmap, calculating $S_1'$ according to a formula $S'=S_1'+S_2'$, calculating a value of c according to a first model, and determining the relationship formula of vegetation index and water; and step 26, according to the relationship formula of vegetation index and water as determined and the NDVIs calculated in the step 22, calculating $S_1'$ and $S_2'$ corresponding to different ROIs, and then obtaining another total water area S'; according to the another total water area, calculating the width $W_1$ of the target water at a sub-pixel scale of less than 10 meters as per a calculation formula as follows:

$$W_1 = \frac{S'}{L}$$

where L represents a length of the river section.

In an embodiment, the calculating a width of the target water using remote sensing data in the step 2 includes:

based on Sentinel-2 remote sensing data, calculating a number $P_w$ of water pixels in a study area, a total number $P_{total}$ of all pixels in the study area and a total image area $S_{total}$ in the study area by using one of an ArcGIS software and the google earth engine (GEE) cloud platform, and calculating a total water area $S_w$ in the study area as per the following formula:

$$S_w = \frac{P_w S_{total}}{P_{total}}$$

and calculating the $W_2$ of the target water using the total water area.

In an embodiment, in the step 3, the remote sensing and estimating a flow velocity and a depth of the target water according to the target width of the target water includes:

calculating a ratio of a different elevation between an upstream cross-section and a downstream cross-section of the river section to a total length of the river section, as per a calculation formula as follows:

$$H = \frac{H_U - H_D}{D}$$

where H represents a gradient, $H_U$ represents an elevation of the upstream cross-section, $H_D$ represents an elevation of the downstream cross-section, and D represents the total length of the river section between the upstream cross-section and the downstream cross-section;

calculating the flow velocity V, as per a formula as follows:

$$V = 1.48 W^{0.8} H^{0.6}$$

where W represents the target width of the target water;

calculating a roughness coefficient n, as per a formula as follows:

$$n = (n_0 + n_1 + n_2 + n_3 + n_4) \times m_5$$

where $n_0$ represents a basic roughness coefficient of a natural straight, smooth and uniform channel (also referred to as reference channel), $n_1$ represents an influence parameter of an irregular water surface, $n_2$ represents an influence parameter considering changes of shape and size of the river section, $n_3$ represents an influence parameter of water blocking substance, $n_4$ represents an influence parameter of vegetation, and $m_5$ represents an influence parameter of meandering change of river;

estimating the depth as per a runoff calculation formula as follows:

$$D = \frac{V \cdot n^{\frac{3}{2}}}{H^{\frac{1}{2}}}.$$

In an embodiment, in the step 3, the calculating a runoff of a small river is carried out as per expression as follows:

$$Q = W \times D \times V.$$

Beneficial effects are that: compared with the related art, the significant advantages of the disclosure are as follows.

The remote sensing sub-pixel runoff inversion method of the disclosure is based on the sub-pixel decomposition remote sensing runoff inversion technology based on the improved vegetation index method. Compared with the runoff inversion technology in the related art, the improved vegetation index method can decompose the pixels to more accurately extract a river width, which can meet accuracy requirements of some small rivers in mountainous areas, and then it can be effectively applied in the flow inversion of the small rivers with high accuracy requirements to improve the runoff inversion effect, which has good economy, practicability, flexibility, and certain physical mechanism.

BRIEF DESCRIPTION OF DRAWING

FIG. 1 illustrates a flowchart of a remote sensing sub-pixel runoff inversion method based on an improved vegetation index method of the disclosure.

DETAILED DESCRIPTION OF EMBODIMENTS

In order to make the purpose, technical solutions, and advantages of the disclosure clearer and more understandable, the following will provide further detailed explanations of the disclosure in conjunction with the accompanying drawings and embodiments.

A remote sensing sub-pixel runoff inversion method based on an improved vegetation index method described in this embodiment, as shown in FIGURE, includes the following steps.

Step 1, an image of a target water from remote sensing satellite data is extracted by using a MNDWI threshold method.

Step 2, a width of the target water is calculated by using remote sensing data, and a width of the target water is inversed by using remote sensing subpixels; accuracies of the widths of the target water being calculated and inversed respectively are compared, and one of the widths of the target water with a higher accuracy is adopted as a target width.

Step 3, a flow velocity and a depth of the target water are remote sensing and estimating according to the target width of the target water, and a runoff of a small river is calculated according to the target width, the depth and the flow velocity.

The step 1 includes the following.

Based on Sentinel-2 remote sensing satellite data provided by a GEE cloud platform, modified normalized difference water indexes (MNDWIs) of a remote sensing satellite image in green waveband and middle-infrared waveband are calculated, as per a calculation as follows:

$$MNDWI = \frac{\rho_{Green} - \rho_{MIR}}{\rho_{Green} + \rho_{MIR}}$$

where $\rho_{Green}$ represents a reflectivity of green waveband, $\rho_{MIR}$ represents a reflectivity of middle-infrared waveband, and a range of a MNDWI is [a, b], a≥−1, b≤1.

A threshold valve $t_0$ is set to divide a MNDWI image into two categories, that is, a part satisfying a≤$t_0$ is classified as a non-water, and a part satisfying $t_0$<b is classified as the target water; occurrence probabilities of the non-water and the target water in the remote sensing satellite image are respectively recorded as $P_{nw}$ and $P_w$, an inter-class variance σ between images of the target water and the non-water is calculated, as a calculation formula as follows:

$$\sigma^2 = P_{nw} \cdot (M_{nw} - M)^2 + P_w \cdot (M_w - M)^2$$

where M represents an overall mean value of the MNDWI image, and M=$P_{nw} \cdot M_{nw} + P_w \cdot M_w$; $M_{nw}$ represents a mean value of MNDWI index of the non-water image, and $M_w$ represents a mean value of MNDWI index of the target water image.

According to the inter-class variance σ, an optimal threshold $T_{opt}$ is calculated, as per a calculation formula as follows:

$$T_{opt} = \text{ArgMax}\{\sigma^2\}$$

The MNDWI image is segmented by using the optimal threshold $T_{opt}$, when MNDWI of a pixel is greater than or equal to $T_{opt}$, a part of the remote sensing image is identified as the target water, otherwise being regarded as the non-water and excluding, thus binary image data is obtained represented as:

$$A = \begin{cases} 1, & MNDWI \geq T_{opt} \\ 0, & MNDWI < T_{opt} \end{cases}$$

where A represents a water contribution value in a binary segmented image.

In the step 1, based on the Sentinel-2 remote sensing satellite data provided by the GEE cloud platform, the MNDWIs are calculated by using green waveband and middle-infrared waveband, and an Otsu method is used to binarize a target river section to calculate a water area. According to gray characteristics of an image, the threshold is set to divide the image into background and target parts, thereby minimizing an intra-class variance and maximizing the inter-class variance.

In the step 2, inversing the width of the target water using the remote sensing subpixels includes the following steps.

Step 21, in the remote sensing satellite image, a river section with vegetation distribution on two sides thereof and substantially straight is selected, and along a direction perpendicular to a flow direction of the river, a single row of pixels, greater than a maximum river width of the river section for many years as a benchmark, is selected as a region of interest (ROI).

Step 22, based on a Sentinel-2 remote sensing satellite image, normalized difference vegetation indexes (NDVIs) of mixed pixels and pure vegetation pixels in the ROI are calculated, and numbers of the mixed pixels, pure water pixels and the pure vegetation pixels are counted through the NDVIs in different ranges.

Step 23, the water area is calculated based on the number of the pure water pixels, as per a calculation formula as follows:

$$S_2' = R \times T^2$$

where $S_2'$ represents the water area corresponding to the pure water pixels, R represents the number of the pure water pixels, and T represents a pixel resolution.

Step 24, according to a relationship between a vegetation area and a water area of each of the mixed pixels and the NDVI of the mixed pixel, a relationship formula between of vegetation index and water is constructed;

$$\frac{NDVI_1}{NDVI_2} = c \times S_1'$$

where $NDVI_1$ represents the NDVI of the mixed pixel, $NDVI_2$ represents the NDVI of each of the pure vegetation pixels, $S_1'$ represents the water area corresponding to the mixed pixel, and c represents a constant to be determined; sub-pixel decomposition is performed on the mixed pixels by using the relationship formula, and effect of vegetation growth on the NDVI is removed by using a ratio of NDVI values in the same period.

Step 25, a total water area S' is measured according to a RGB image with a higher resolution provided by Ovitalmap, $S_1'$ is calculated according to a formula $S'=S_1'+S_2'$, a value of c is calculated according to a first model, and the relationship formula of vegetation index and water is determined.

Step 26, according to the relationship formula of vegetation index and water as determined, $S_1'$ and $S_2'$ corresponding to different ROIs are calculated, and then another total water area S' is obtained; according to the another total water area, the $W_1$ of the target water is calculated at a sub-pixel scale of less than 10 meters, as per a calculation formula as follows:

$$W_1 = \frac{S'}{L}$$

where L represents a length of the river section.

In the step 22, a maximum value of NDVI in the ROI is recorded as $NDVI_{max}$, a minimum value of NDVI is recorded as $NDVI_{min}$. Pixels with NDVI values greater than or equal to $0.9 \times NDVI_{max}$ are considered as the pure vegetation pixels, pixels with NDVI values less than or equal to $1.1 \times NDVI_{min}$ are considered as the pure water pixels, and pixels with NDVI values greater than $1.1 \times NDVI_{min}$ and less than $0.9 \times NDVI_{max}$ are considered as the mixed pixels. A relationship among the three is that the number of the pure vegetation pixels plus the number of the pure water pixels is equal to the number of all pixels in the ROI. A calculation formula of NDVI is: a ratio of a difference between near-infrared (NIR) and red light (Red) to a sum of them, that is: NDVI=(NIR−Red)/(NIR+Red). Through NDVI in different ranges, the mixed pixels (pixels containing both water and vegetation), the pure water pixels (pixels containing only water) and the pure vegetation pixels (pixels containing only vegetation) are distinguished as follows:

the mixed pixels: $NDVI \geq 0.9 \times NDVI_{max}$
the pure water pixels: $NDVI \leq 1.1 \times NDVI_{min}$
the pure vegetation pixels: $1.1 \times NDVI_{min} < NDVI < 0.9 \times NDVI_{max}$ Furthermore, in the step 2, calculating the width of the target water by using the remote sensing data includes the following.

based on Sentinel-2 remote sensing data, a number $P_w$ of water pixels in a study area, a total number $P_{total}$ of all pixels in the study area and a total image area $S_{total}$ in the study area are calculated by using one of an ArcGIS software and the GEE cloud platform, and a total water area $S_w$ in the study area is calculated as per the following formula:

$$S_w = \frac{P_w S_{total}}{P_{total}}$$

The f width $W_2$ of the target water is calculated by using the total water area.

Furthermore, in the step 3, remote sensing and estimating the flow velocity and the depth of the target water according to the target width of the target water includes the following.

A ratio of a different elevation between an upstream cross-section and a downstream cross-section of the river section to a total length of the river section is calculated, as per a calculation formula as follows:

$$H = \frac{H_U - H_D}{D}$$

where H represents a gradient, $H_U$ represents an elevation of the upstream cross-section, $H_D$ represents an elevation of the downstream cross-section, and D represents the total length of the river section between the upstream cross-section and the downstream cross-section. For example, SRTM DEM data of 30 meters resolution provided by SARscape is used to calculate the different elevation of the river section, in the Arc GIS software, elevation values at 30-meter river segment intervals along a river centerline are extracted to calculate the gradient.

The flow velocity V is calculated, as per a formula as follows:

$$V = 1.48 W^{0.8} H^{0.6}$$

where W represents the target width of the target water.

A roughness coefficient n is calculated, as per a formula as follows:

$$n = (n_0 + n_1 + n_2 + n_3 + n_4) \times m_5$$

where $n_0$ represents a basic roughness coefficient of a natural straight, smooth and uniform channel, $n_1$ represents an influence parameter of an irregular water surface, $n_2$ represents an influence parameter considering changes of shape and size of the river section, $n_3$ represents an influence parameter of water blocking substance, $n_4$ represents an influence parameter of vegetation, and $m_5$ represents an influence parameter of meandering change of river.

The depth is estimated as per a runoff calculation formula as follows:

$$D = \frac{V \cdot n^{\frac{3}{2}}}{H^{\frac{1}{2}}}.$$

In an embodiment, roughness coefficient values can be shown in Table 1 below.

TABLE 1

Range of the roughness coefficient values

| river and canal conditions | | | value |
|---|---|---|---|
| material | $n_0$ | earth material | 0.020 |
| | | stone material | 0.025 |
| | | fine gravel | 0.024 |
| | | cobble | 0.028 |
| irregularity degree | $n_1$ | smooth | 0.000 |
| | | smaller | 0.005 |
| | | moderate | 0.010 |
| | | severe | 0.020 |
| river cross-section variation | $n_2$ | gradual | 0.000 |
| | | rarely changing | 0.005 |
| | | frequently changing | 0.010~0.015 |
| water blocking effect | $n_3$ | negligible | 0.000 |
| | | small | 0.010~0.015 |
| | | moderate | 0.020~0.030 |
| | | severe | 0.040~0.060 |
| vegetation | $n_4$ | short | 0.005~0.010 |
| | | moderate | 0.010~0.025 |
| | | high | 0.025~0.050 |
| | | very high | 0.050~0.100 |
| sinuosity | $m_5$ | smaller | 1.000 |
| | | moderate | 1.150 |
| | | severe | 1.300 |

Furthermore, in the step 3, a formula for calculating the runoff of the small river is:

$$Q = W \times D \times V.$$

Based on the calculated widths $W_1$ and $W_2$ of the small river, the accuracies of the widths $W_1$ and $W_2$ are compared to make the one of the widths with the higher accuracy as the target width W, a hydraulic model is established, and the runoff of the small river is obtained by inputting the river width, water depth and the flow velocity.

The disclosure extracts the target water based on the sentinel-2 remote sensing satellite data provided by the GEE cloud platform combined with the improved vegetation index method, and the improved vegetation index method can consider influence of vegetation growth on river width inversion. The water area is obtained by calculating a proportion of the water pixels to the total study area, and the river width is calculated combined with the length of the river section. A digital elevation model (DEM) is used to remotely estimate hydraulic parameters such as river lengths, widths, roughnesses, gradients, depths, and flow velocities. Based on the improved vegetation index method, the relationship between the normalized difference vegetation indexes and the water is established, and the sub-pixel decomposition is performed on the mixed pixels to calculate the river width at a sub-pixel scale of less than 10 meters, thereby enhancing the accuracy of remote sensing calculations for river width. The hydraulic model is then established based on the calculated river width, and the runoff of the small river is inversed.

Generally, runoff observation stations cannot be installed in no man's land or areas with complex terrain, and remote sensing runoff inversion methods in the related art were mainly limited to image resolution, and were more applied to rivers with large width. However, because the river boundary could not be well identified, the disclosure is based on the improved vegetation index method for sub-pixel decomposition remote sensing runoff inversion technology. Compared with the runoff inversion technology in the related art, the improved vegetation index method can extract the river width with higher accuracy by decomposing the pixels, which can meet the accuracy requirements of some small rivers in mountainous areas, and then effectively applied to flow inversion of small rivers with high accuracy requirements, thereby improving the runoff inversion effect and having with better economy, practicability, flexibility, and a certain physical mechanism.

What is claimed is:

1. A remote sensing sub-pixel runoff inversion method based on an improved vegetation index method, comprising the following steps:

step 1, extracting an image of a target water from remote sensing satellite data using a modified normalized difference water index (MNDWI) threshold method;

step 2, calculating a width of the target water using remote sensing data, and inversing a width of the target water using remote sensing subpixels; comparing accuracies of the widths of the target water obtained by the calculating and the inversing respectively, and using one of the widths of the target water with a higher accuracy as a target width;

step 3, remote sensing and estimating a flow velocity and a depth of the target water according to the target width of the target water, and calculating a runoff of a small river according to the target width, the depth and the flow velocity; and step 4: superposing the runoff of the small river onto a satellite image map to obtain a superposed image map; and displaying the superposed image map on a display screen; the superposed image map is configured to present information associated with the runoff of the small river, which makes related personnel aware of the runoff of the small river, thereby allowing the related personnel to take necessary response measures including sending flood warnings to people and evacuating the people;

wherein the inversing a width of the target water using remote sensing subpixels in the step 2 comprises the following steps:

step 21, selecting a river section being with vegetation distribution on two sides thereof and substantially straight in a remote sensing satellite image, using a maximum river width of the river section over a plurality of years as a benchmark, and selecting, along a direction perpendicular to a flow direction of the river, a single row of pixels being greater than the maximum river width as a region of interest (ROI);

step 22, based on a Sentinel-2 remote sensing satellite image, calculating normalized difference vegetation indexes (NDVIs) of mixed pixels and pure vegetation pixels in the ROI, and counting numbers of the mixed pixels, pure water pixels and the pure vegetation pixels through the NDVIs in different ranges;

step 23, calculating a water area based on the number of the pure water pixels, as per a calculation formula as follows:

$$S_2' = R \times T^2$$

where $S_2'$ represents the water area corresponding to the pure water pixels, R represents the number of the pure water pixels, and T represents a pixel resolution;

step 24, according to a relationship between a vegetation area and a water area of each of the mixed pixels and the NDVI of the mixed pixel, constructing a relationship formula of vegetation index and water;

$$\frac{NDVI_1}{NDVI_2} = c \times S_1'$$

where $NDVI_1$ represents the NDVI of the mixed pixel, $NDVI_2$ represents the NDVI of each of the pure vegetation pixels, $S_1'$ represents the water area corresponding to the mixed pixel, and c represents a constant; and performing sub-pixel decomposition on the mixed pixels by using the relationship formula;

step 25, measuring a total water area S' according to a red, green and blue (RGB) image provided by Ovitalmap, calculating $S_1'$ according to a formula $S'=S_1'+S_2'$, calculating a value of the constant c according to the relationship formula of vegetation index and water; and step 26, according to the relationship formula of vegetation index and water as determined and the NDVIs calculated in the step 22, calculating $S_1'$ and $S_2'$ corresponding to different ROIs, and then obtaining another total water area S'; according to the another total water area, calculating the width $W_1$ of the target water at a sub-pixel scale of less than 10 meters as per a calculation formula as follows:

$$W_1 = \frac{S'}{L}$$

where L represents a length of the river section;

wherein the calculating a width of the target water using remote sensing data in the step 2 comprises:

based on Sentinel-2 remote sensing data, calculating a number $P_w$ of water pixels in a study area, a total number $P_{total}$ of all pixels in the study area and a total image area $S_{total}$ in the study area by using one of an ArcGIS software and a google earth engine (GEE) cloud platform, and calculating a total water area $S_w$ in the study area as per the following formula:

$$S_w = \frac{P_w S_{total}}{P_{total}}$$

and calculating the width $W_2$ of the target water using the total water area.

2. The remote sensing sub-pixel runoff inversion method based on the improved vegetation index method as claimed in claim 1, wherein the step 1 comprises:

based on Sentinel-2 remote sensing satellite data provided by the GEE cloud platform, calculating modified normalized difference water indexes (MNDWIs) of the remote sensing satellite image in green waveband and middle-infrared waveband, as per a calculation formula as follows:

$$MNDWI = \frac{\rho_{Green} - \rho_{MIR}}{\rho_{Green} + \rho_{MIR}}$$

where $\rho_{Green}$ represents a reflectivity of green waveband, $\rho_{MIR}$ represents a reflectivity of middle-infrared waveband, and a range of a MNDWI is [a, b], a≥−1, b≤1;

setting a threshold value $t_0$ to divide a MNDWI image into two categories, that is, classifying a part satisfying a≤$t_0$ as a non-water and a part satisfying $t_0$<b as the target water; recording occurrence probabilities of the non-water and the target water in the remote sensing satellite image as $P_{nw}$ and $P_w$ respectively, and calculating an inter-class variance σ between images of the target water and non-water, as per a calculation formula as follows:

$$\sigma^2 = P_{nw} \cdot (M_{nw} - M)^2 + P_w \cdot (M_w - M)^2$$

where M represents an overall mean value of the MNDWI image, and $M = P_{nw} \cdot M_{nw} + P_w \cdot M_w$; $M_{nw}$ represents a mean value of MNDWI index of the non-water image, and $M_w$ represents a mean value of MNDWI index of the target water image;

calculating an optimal threshold $T_{opt}$ according to the inter-class variance σ, as per a calculation formula as follows:

$$T_{opt} = \text{ArgMax}\{\sigma^2\}$$

segmenting the MNDWI image using the optimal threshold $T_{opt}$, identifying a part of the remote sensing image as the target water when MNDWI of a pixel is greater than or equal to $T_{opt}$, otherwise regarding as the non-water and excluding, thereby obtaining binary image data represented as:

$$A = \begin{cases} 1, & MNDWI \geq T_{opt} \\ 0, & MNDWI < T_{opt} \end{cases}$$

where A represents a water contribution value in a binary segmented image.

3. The remote sensing sub-pixel runoff inversion method based on the improved vegetation index method as claimed in claim 2, wherein in the step 3, the remote sensing and estimating a flow velocity and a depth of the target water according to the target width of the target water comprises:

calculating a ratio of a difference of elevation between an upstream cross-section and a downstream cross-section of the river section to a total length of the river section, as per a calculation formula as follows:

$$H = \frac{H_U - H_D}{D}$$

where H represents a gradient, $H_U$ represents an elevation of the upstream cross-section, $H_D$ represents an elevation of the downstream cross-section, and D represents the total length of the river section between the upstream cross-section and the downstream cross-section;

calculating the flow velocity V, as per a formula as follows:

$$V = 1.48 W^{0.8} H^{0.6}$$

where W represents the target width of the target water;

calculating a roughness coefficient n, as per a formula as follows:

$$n = (n_0 + n_1 + n_2 + n_3 + n_4) \times m_5$$

where $n_0$ represents a basic roughness coefficient of a natural straight, smooth and uniform channel, $n_1$ represents an influence parameter of an irregular water surface, $n_2$ represents an influence parameter considering changes of shape and size of the river section, $n_3$ represents an influence parameter of water blocking substance, $n_4$ represents an influence parameter of vegetation, and $m_5$ represents an influence parameter of meandering change of river;

estimating the depth as per a runoff calculation formula as follows:

$$D = \frac{V \cdot n^{\frac{3}{2}}}{H^{\frac{1}{2}}}.$$

4. The remote sensing sub-pixel runoff inversion method based on the improved vegetation index method as claimed in claim 3, wherein in the step 3, the calculating a runoff of a small river is carried out as per an expression as follows:

$$Q = W \times D \times V.$$

* * * * *